United States Patent [19]
Henry

[11] 4,193,465
[45] Mar. 18, 1980

[54] SCALE HOPPER DOOR MECHANISM

[75] Inventor: Nelson R. Henry, Decatur, Ga.

[73] Assignee: The Woodman Company, Inc., Decatur, Ga.

[21] Appl. No.: 872,945

[22] Filed: Jan. 27, 1978

[51] Int. Cl.² .......................... G01G 13/16; B67D 3/00
[52] U.S. Cl. ..................................... 177/108; 222/505
[58] Field of Search ............................... 177/105–108, 177/112; 222/505, 506

[56] References Cited

U.S. PATENT DOCUMENTS

| | | | |
|---|---|---|---|
| 1,560,416 | 11/1925 | Dickinson et al. | |
| 2,890,013 | 6/1959 | Schieser et al. | 177/108 |
| 2,904,304 | 9/1959 | Zwoyer et al. | |
| 3,086,564 | 4/1963 | Staff | 141/81 |
| 3,379,267 | 4/1968 | Mackenzie | 177/108 |

FOREIGN PATENT DOCUMENTS 366286  2/1932  United Kingdom ..................... 177/105

*Primary Examiner*—George H. Miller, Jr.
*Attorney, Agent, or Firm*—Lowe, King, Price & Becker

[57] ABSTRACT

A door mechanism for controlling flow of loose products, such as potato chips, from a scale hopper in a packaging machine comprises a hinged door, a spring biasing the door towards its closed position, an arm attached to the door, a cam follower carried by the arm, and a cam acting in combination with the cam follower to force the door open against the influence of the spring. The cam is mounted independently of the scale hopper and the cam follower is not in contact with the cam while product is being weighed in the scale hopper. When weight has been made, the cam is rotated in response to signals generated by the weighing scale. The profile of the cam is such as to rapidly open and close the door for dumping and provides smooth vibration-free operation. The slope of the cam lobe portion during opening of the door provides an uplifting scale restoring force so that the scale is immediately returned to zero weight in readiness for the next cycle.

7 Claims, 6 Drawing Figures

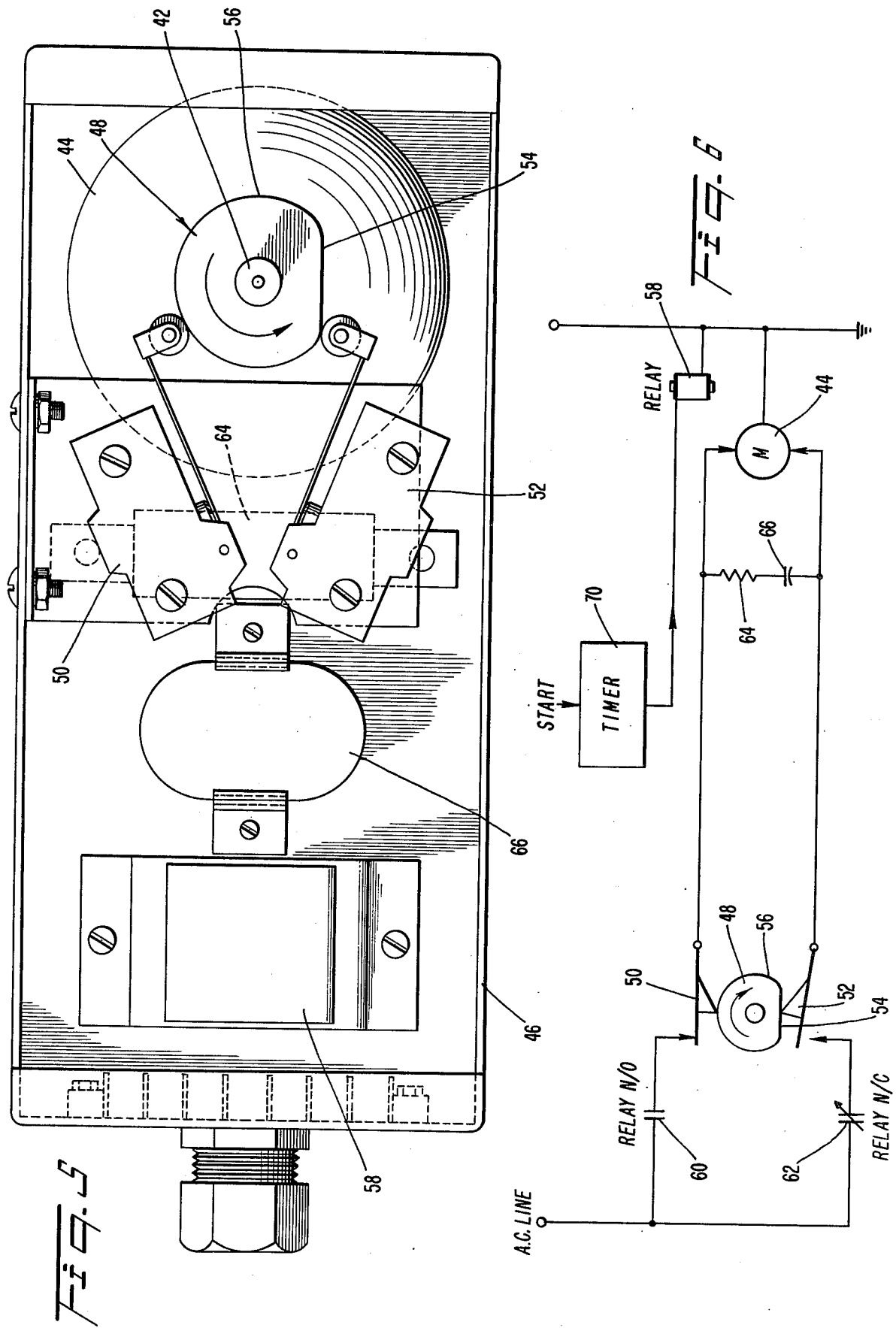

SCALE HOPPER DOOR MECHANISM

FIELD OF THE INVENTION

The present invention relates generally to form and fill packaging machines, wherein weighted charges of loose product, such as potato chips, are delivered for unit packaging. The invention is directed more particularly toward a scale hopper door mechanism comprising a door hingedly mounted on a scale hopper and movable between a first position in which it blocks egress of the contents of the hopper and a second position in which it permits egress of the contents of the hopper.

BACKGROUND OF THE INVENTION

In the manufacture of potato chips or other loose product, chips are continuously advanced by a series of vibratory feed conveyors from a cooker to the weighing scale of a form and fill machine wherein successive batches of the chips are separated for packaging. The chips are fed from the discharge end of the last conveyor in the series to a scale hopper for product weighing. When the weight of the chips in the hopper is equal to the desired weight, the scale actuates one or more switches (1) to close a door located between the last conveyor in the series and the access opening of the scale hopper and (2) to open a door located at the egress opening of the scale hopper.

An example of a prior art hopper door mechanism is shown in U.S. Pat. No. 2,904,304, issued Sept. 15, 1959, to Zwoyer et al. As shown therein, a solenoid is mounted on the scale hopper itself and is pivotally connected via a suitable lever system to the hopper door. Actuation of the solenoid in one direction opens the door against the influence of a return spring, while de-energization of the solenoid allows the door to close under the influence of the return spring.

The above-described type of scale hopper door mechanism is not as accurate as is desirable for at least two reasons. In the first place, the weight of the solenoid and its accessory linkages becomes part of the tare weight of the hopper, increasing the tare weight percentage of the total weight and thus reducing the accuracy of the measurement of the product weight percentage of the total weight. And, in the second place, since the solenoid is mounted on the hopper and since the weighing operation is intended to be extremely high-speed, the dynamic effect of the movement of the solenoid is still felt on the hopper during the weighing operations, thereby introducing an unpredictably fluctuating factor into the perceived weight.

Attempts have been made to separate the door operator from the scale hopper to alleviate these problems. In doing so, complicated motion transmission systems including slip links, cams, and/or leaf springs have been used, such as shown in U.S. Pat. No. 3,086,564 issued Apr. 23, 1963 to Staff. The prior devices have been generally rough and noisy in operation and lacking in the desired capability of efficient high speed operation. Furthermore, the prior devices depend on internal springs or the like to restore the scale to zero weight position.

There exists a need, therefore, to provide a scale hopper door mechanism in a form and fill packaging machine of the type described wherein the above mentioned deficiencies are overcome.

Accordingly, one object of the present invention is to provide a new and improved scale hopper door mechanism for quietly and rapidly controlling flow of loose product between a scale hopper and the package of a packaging machine.

Another object of the present invention is to provide a new and improved scale hopper door mechanism in which the hopper is disengaged or separated from the cam opener during the time the scale is making weight.

Still another object is to provide a scale hopper opener wherein a scale restoring force is applied automatically as an adjunct to the opening of the hopper door.

Still another object of the invention is to provide a new and improved scale hopper door mechanism in which a substantially reduced percentage of the weight of the mechanism opening and shutting the hopper door is a part of the tare weight of the hopper and the dynamic effects on the perceived weight of the hopper caused by the movements of the mechanism opening and shutting the hopper door are substantially reduced.

SUMMARY OF THE INVENTION

A door mechanism for controlling flow of loose product, such as potato chips, between a scale hopper and the form and fill package of a packaging machine comprises a hinged door on the hopper, a tension spring biasing the door towards its closed position, an arm attached to the door, a cam follower carried by the arm, and a cam acting in combination with the cam follower to force the door open against the influence of the spring. The cam is mounted independently of the scale hopper and the cam follower is not in contact with the cam while product is being weighed in the scale hopper. When weight has been made, the cam is rotated in response to signals generated by the weighing scale, thereby forcing the door open and allowing the loose product to dump into the package. After the loose product has been dumped, the cam follower maintains contact while the cam reverses to return to the original or home position. At the home position, the cam follower then loses contact with the cam, allowing the door to close under the influence of the spring for the next weighing cycle. During weighing, the cam remains out of contact with the cam follower.

The cam has a profile especially adapted to carry out the desired function of the gate more efficiently than has been accomplished in the past. An initial operative lobe portion has a rapid, but smooth rise, to provide quick vibration-free opening of the door as soon as weight has been made. At the same time that the gate is opened, the hopper is being lifted by the cam to restore the scale to the zero weight position. This happens because the initial lobe portion is under the follower and the opening force is thus converted to a concurrent lifting force by acting through the pivot mounting of the door. A circular lobe portion of the cam holds the door wide open and steady for dumping the product. When the cam is returned to its original position, its cam surface is completely out of engagement with the cam follower to avoid any inaccuracy in the subsequent weighing and filling operation.

Still other objects, advantages and features of the invention will become readily apparent to those skilled in this art from the following detailed description wherein I have shown and described only the preferred embodiment of the invention, simply by way of illustration of the best mode contemplated by me of carrying out my invention. As will be realized, the invention is capable of other and different embodiments, and its several details are capable of modifications in various obvious respects all without departing from the invention. Accordingly, the drawings and description are to be regarded as illustrative in nature, and not as restrictive.

BRIEF DESCRIPTION OF THE DRAWINGS

FIG. 5 is an opposite side view of the scale hopper door mechanism shown in FIG. 1, illustrating a cam-operated microswitch circuit which controls the opening and closing of the scale hopper door; and FIG. 6 is a schematic diagram of the cam-operated microswitch control circuit.

DETAILED DESCRIPTION OF A PREFERRED EMBODIMENT

Figure 1:
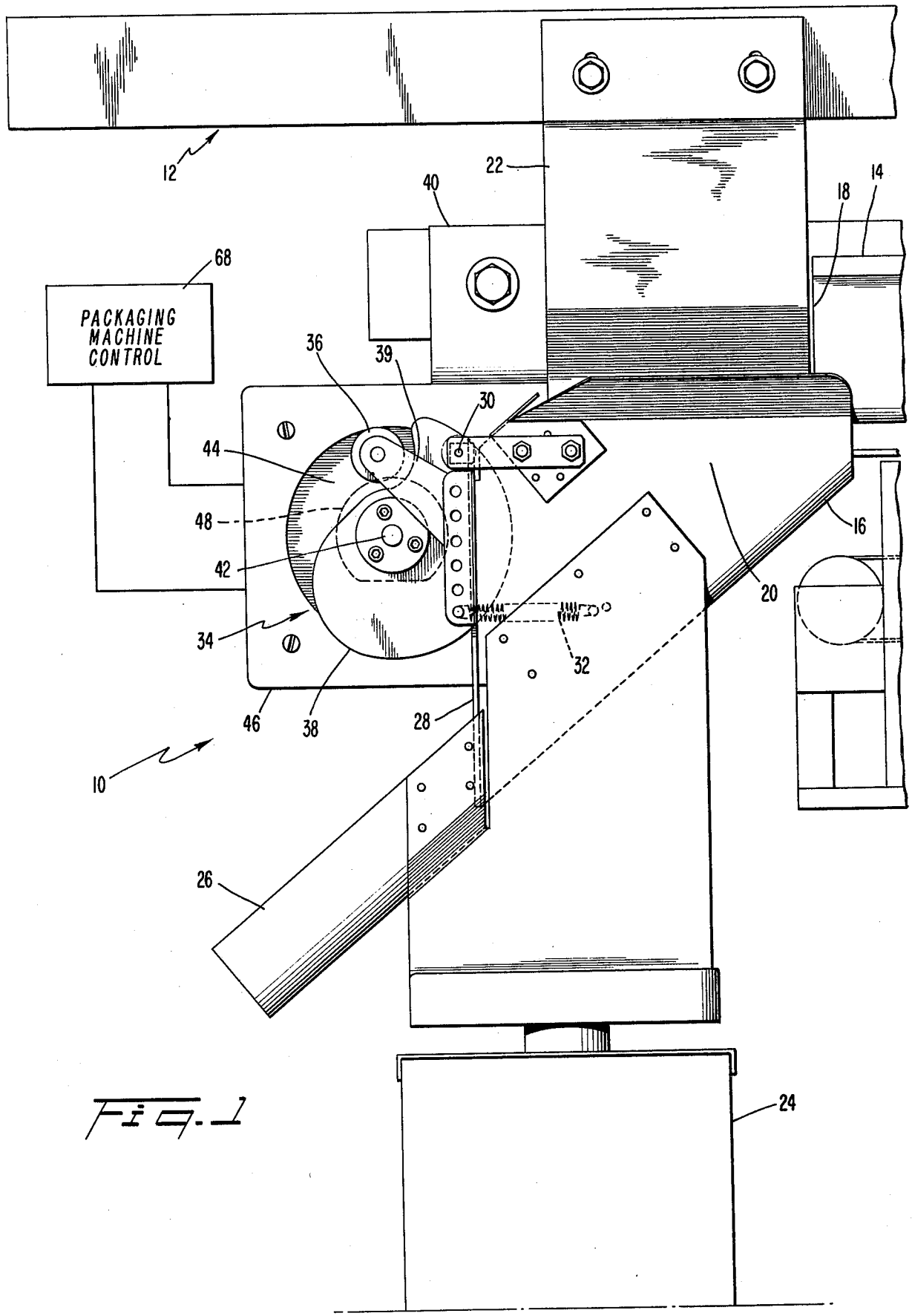
FIG. 1 is a side view of a portion of a feeding and weighing system incorporating a scale hopper door mechanism in accordance with the principles of the present invention.

Referring to FIG. 1, there is shown a feeding system, generally 10, which comprises a support 12 for a vibratory support hopper (not shown) providing a source of loose product to be packaged and a secondary vibratory feed conveyor 14 for moving the product to a scale hopper 16 for weighing. The supply hopper and the second vibratory feed conveyor 14 are, in use, coupled together through a primary vibratory feed conveyor, not shown herein for brevity. Reference is made herein to my previous U.S. Pat. No. 3,578,094, issued May 11, 1971 and assigned to the Assignee of the present invention, for a detailed description of a complete vibratory feed conveyor system of the type forming the environment of the present invention.

As will be seen in more detail below, in certain respects the invention is particularly adapted for feeding potato chips in a form and fill packaging machine. However, it is to be understood that other loose products could be fed and successfully weighed by the system 10 with little or no modification of the structure shown by utilizing the principles of the present invention.

Potato chips transferred to the feed conveyor 14 from the supply hopper are caused by the vibratory motion of the feed conveyor 14 to flow toward discharge end 18 thereof, from which they are periodically fed into scale hopper 16. An upper portion 20 of the scale hopper 16 is adapted to receive the product. The scale hopper 16 is supported on a scale 24, and, at a lower portion of the scale hopper 16, there is provided a chute 26 for discharging weighed batches of chips for packaging. Discharge of chips is controlled by a hopper door 28 pivotably mounted to the scale hopper 16 at 30 and biased toward its closed position by a tension spring 32 connected at one end to the scale hopper 16 and at the other end to a selected position on the hopper door 28.

The quantity of chips supplied by system 10 for packaging during each cycle of operation is controlled by weighing the chips after being discharged from feed conveyor 14 into the scale hopper 16. When a predetermined weight of the chips has been measured by the scale 24, discharge of the chips from the feed conveyor 14 is terminated by means not shown and the hopper door 28 is opened by scale hopper door mechanism, generally 34.

Figure 2:
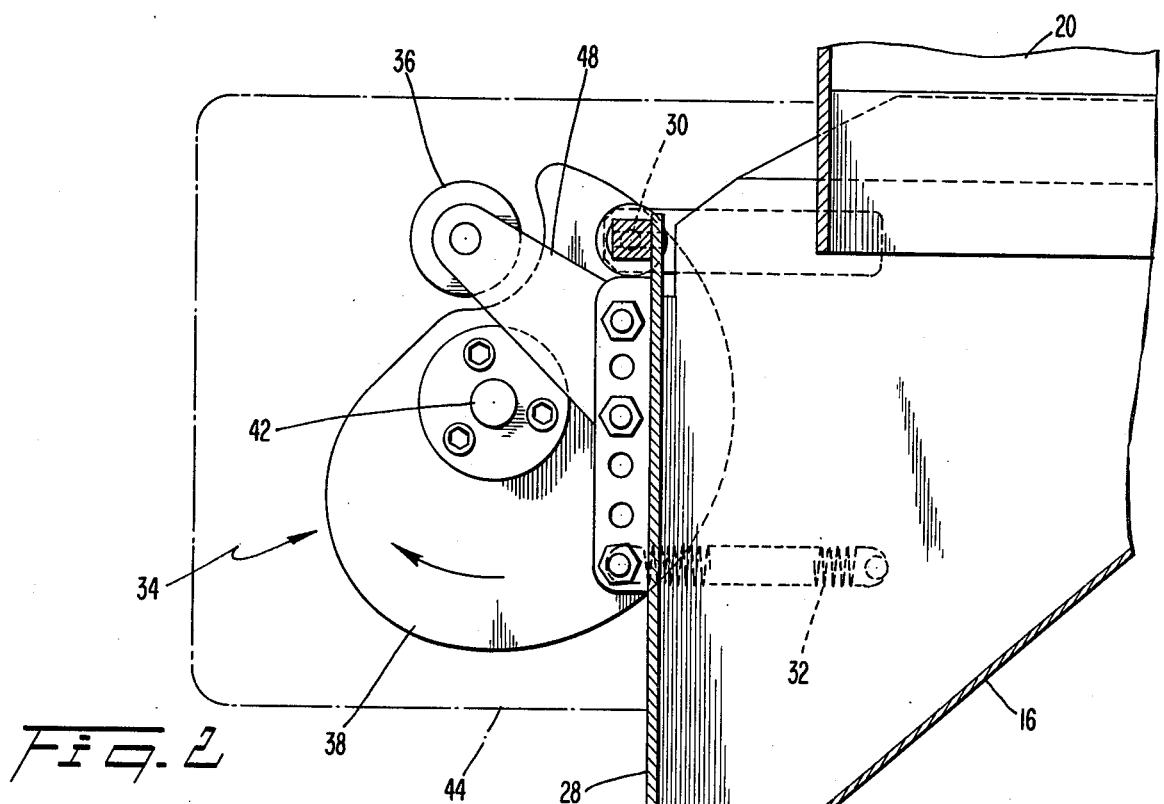
FIG. 2 is a fragmentary view on an enlarged scale of the mechanism shown in FIG. 1 with the scale hopper door shown in a closed position and in cross section along line 2—2 of FIG. 4.
Figure 3:
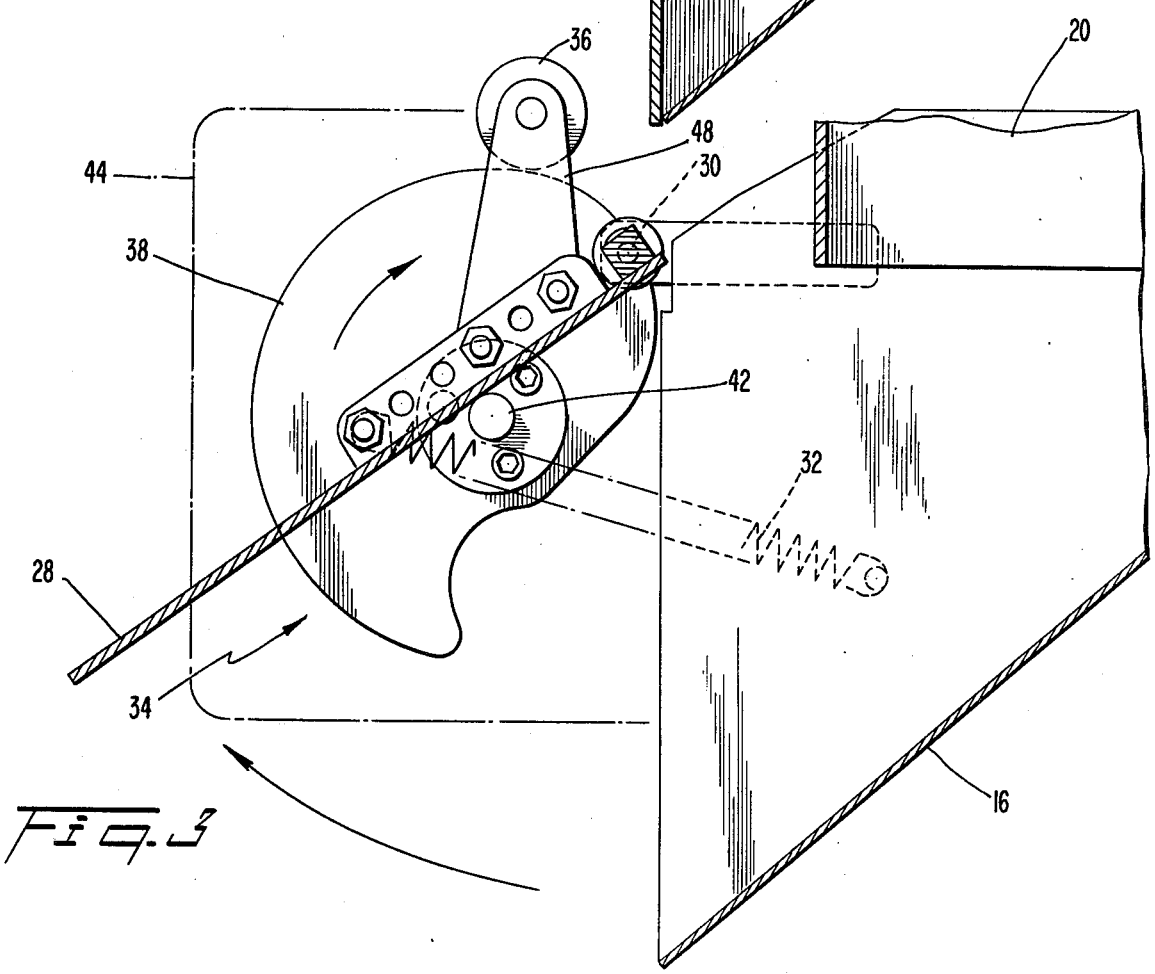
FIG. 3 is similar to FIG. 2, with the scale hopper door in an open position.
Figure 4:
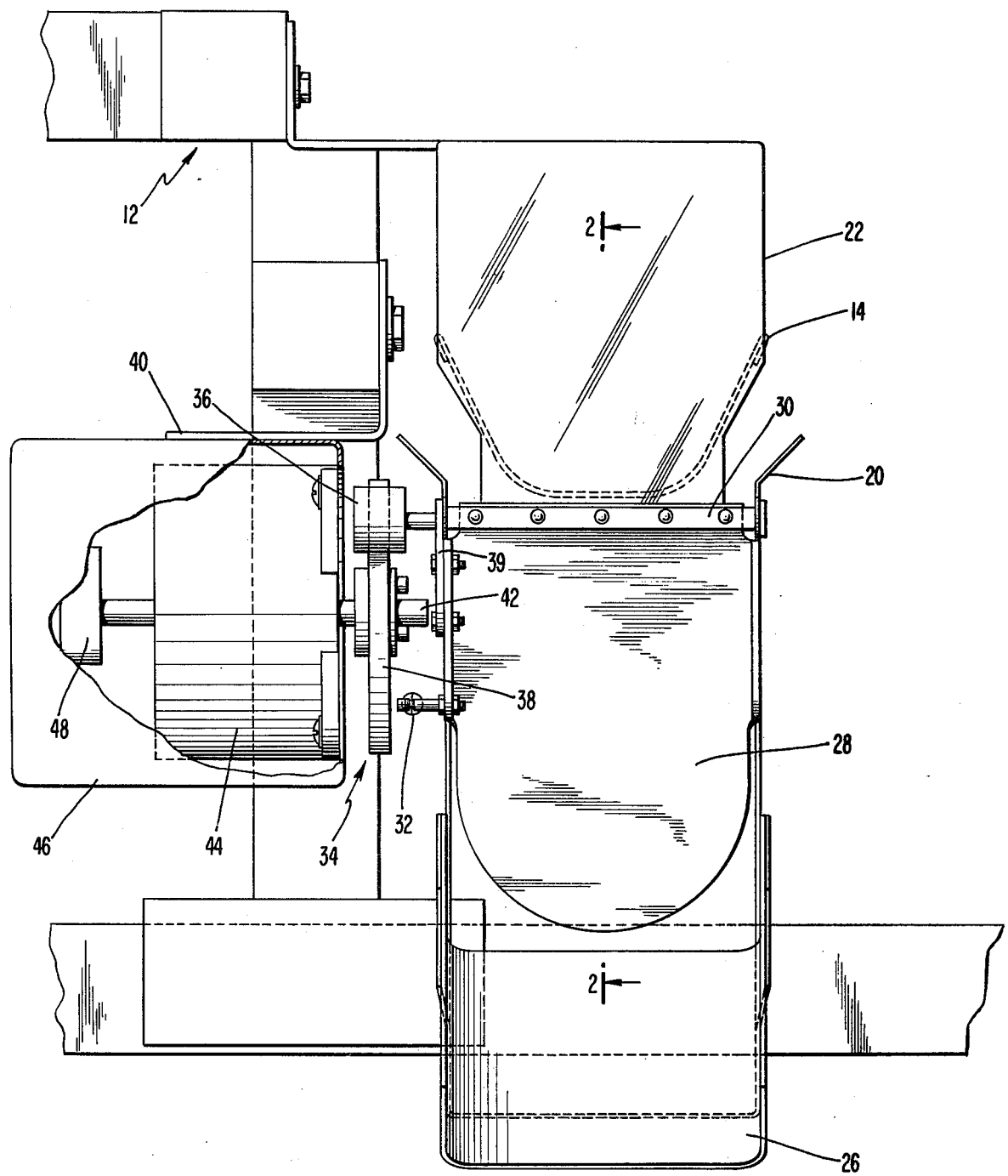
FIG. 4 is a front view of the mechanism shown in FIG. 1, showing the plane of the cross section of the door of FIGS. 2 and 3.

Referring to FIGS. 2 and 3, a preferred embodiment of the scale hopper door mechanism 34 comprises a cam follower 36 (preferably, as shown, a cam roller) and a rotatable cam 38. As best seen in FIG. 4, the cam follower 36 is mounted on an arm 39 secured to the hopper door 28, while the cam 38 is mounted independently of the scale hopper 16, the hopper 28, and the scale 24 by a bracket 40 carried by the support frame 12. Specifically, the cam 38 is mounted at one end of an output shaft 42 of motor 44 which is secured within a housing 46 mounted on the bracket 40. The opposite end of the motor output shaft 42 supports a switch cam 48 which operates a pair of microswitches 50 and 52 (FIG. 5). Each microswitch includes a cam follower arm engageable with the periphery of switch cam 48 to open the microswitch when the follower arm engages a flat cam surface 54 and to close the microswitch when the arm engages a circular cam surface 56. The microswitches form part of a motor control circuit (shown in FIG. 6) which actuates motor 44 in response to signals generated by the scale 24 when it senses the presence of a predetermined weight of chips in the scale hopper 16.

As shown in FIGS. 5 and 6, the microswitch control circuit includes a relay 58 having a first set of normally open contacts 60 connected in series with microswitch 50 between an AC line and one side of the motor field coil and a second set of normally closed contacts 62 connected in series with microswitch 52 between the AC line and the opposite side of the motor field coil. A phase shift network comprising a resistor 64 and a capacitor 66 is connected across the motor field coil to provide a desired phase shift and to permit the motor to be reversed. A packaging machine control circuit 68 (FIG. 1) includes a timer 70 (FIG. 6) which provides dump signals of predetermined duration to operate relay 54 in response to signals from scale 24.

At the start of a weighing cycle, switch cam 48 is located in the position shown in FIGS. 5 and 6, i.e., with the follower arm of microswitch 52 engaging its flat cam surface 54 and the follower arm of microswitch 50 engaging its circular cam surface 56. Thus, microswitch 50 is initially closed and microswitch 52 is initially open.

When a desired weight is accumulated in hopper 16, scale 24 provides a start signal to initiate operation of timer 70 which energizes relay 58. As a result, relay contacts 62 are opened while relay contacts 60 are closed to complete the motor field control circuit through microswitch 50 to actuate motor 44 and rotate door control cam 38 in a clockwise direction (as viewed in FIGS. 1-3) to open the hopper door 28. Upon rotation of timing cam 48 (FIGS. 5 and 6) sufficiently to bring its flat cam surface 54 into engagement with the follower arm of microswitch 50, the microswitch is opened to break the motor field control circuit and terminate operation of motor 44. The motor remains stopped with the hopper door open for the duration of the dump signal from timer 70.

When the dump signal from timer 70 is terminated, relay 58 is de-energized to open relay contacts 60 and close relay contacts 62. Since microswitch 52 is now closed, the motor field control circuit is completed in the opposite direction to reverse motor 44 and door control cam 38 to return the hopper door to its closed position. When switch cam 48 returns to its initial position, the follower arm of microswitch 52 again engages its flat cam surface 54 to open the microswitch and break the motor control circuit to terminate operation of motor 44. The hopper door remains closed until initiation of the next dump signal.

As best seen in FIG. 2, the cam follower 36 is not in contact with the door control cam 38 when the hopper door 28 is closed and product is being weighed in the scale hopper 16. When weight is made, however, the cam 38 rotates (clockwise in FIGS. 1–3), quickly coming into contact with the cam follower 36 and forcing the hopper door 28 to pivot from the position shown in FIG. 2 to the position shown in FIG. 3 against the bias of the spring 32.

Preferably, the profile or shape of cam 38 is designed to cause rapid opening of the hopper door 28. Specifically, the cam includes an initial lobe portion having a rapid but smooth positive rise operatively causing the opening and a circular lobe portion of substantially 180° for holding the door open. With the cam 38 in its initial position (FIGS. 1 and 2), there is sufficient clearance between its cam surface and cam follower 36 to isolate the hopper during the weighing operation.

The cam follower 36 is held above the cam 38 so that an upward scale restoring force is applied through the arm 39 and the pivot 30 as the door opening operation is commenced. Working against the damper mechanism of the scale 24, the initial shock of cam engagement is minimized for smoother overall operation. After the relatively small restoring distance is traveled and working against the upward movement stop of the scale 24, the door is then opened as described. After the load has been dumped and the cam 38 returned to its original position, the scale is steadied in its upper position ready for the next weighing cycle.

In this disclosure there is shown and described only the preferred embodiment of the invention, but, as aforementioned, it is to be understood that the invention is capable of other and different combinations and environments, and is capable of changes or modifications within the scope of the inventive concept as expressed herein.

What is claimed is:

1. A scale hopper door mechanism for controlling flow of loose product from a scale hopper in a packaging machine, said mechanism comprising a pivoted door, means biasing said door towards its closed position, a cam follower carried by said door, and a rotary cam acting in combination with said cam follower to force said door open against the influence of said biasing means, said rotary cam being mounted independently of the scale hopper, and said rotary cam having a profile such that said cam follower is not in contact with said rotary cam while product is being weighed in the scale hopper.

2. The scale hopper door mechanism of claim 1 and further comprising means for rotating said cam intermittently in response to signals generated by the scale.

3. The scale hopper door mechanism of claim 1 wherein said cam follower is carried by an arm attached to said door.

4. The scale hopper door mechanism of claim 1 wherein said cam follower mechanism is mounted above said cam so that a scale restoring force is provided during opening of the door.

5. The scale door hopper mechanism of claim 1, which includes a reversible motor for rotating said cam and a motor control circuit for operating said motor to rotate said cam between a door open and a door closed position.

6. The scale hopper door mechanism of claim 5, wherein said motor control circuit includes a switch cam mounted for rotation by said motor and a pair of microswitches alternately operable by said switch cam for controlling the direction of operation of said motor.

7. The scale hopper door mechanism of claim 6, wherein said motor control circuit includes a timer operable upon-accumulation of a desired weight in said scale hopper for initiating operation of said motor to rotate said first cam to its door open position for a predetermined time to allow said scale hopper to empty.

* * * * *